US007864247B2

(12) United States Patent
Lai

(10) Patent No.: US 7,864,247 B2
(45) Date of Patent: Jan. 4, 2011

(54) METHOD AND APPARATUS FOR IMAGE SCALING

(75) Inventor: Yao-Hung Lai, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1174 days.

(21) Appl. No.: 11/506,258

(22) Filed: Aug. 18, 2006

(65) Prior Publication Data

US 2008/0043148 A1 Feb. 21, 2008

(51) Int. Cl.
*H04N 7/01* (2006.01)
*H04N 11/20* (2006.01)

(52) U.S. Cl. ........................ 348/458; 348/536; 348/581; 345/668; 382/298

(58) Field of Classification Search ................ 348/581, 348/441–458, 536, 537, 501; 345/660, 667–671; 382/298, 299
See application file for complete search history.

(56) References Cited

U.S. PATENT DOCUMENTS

| | | | | |
|---|---|---|---|---|
| 5,739,867 | A * | 4/1998 | Eglit | 348/581 |
| 7,359,007 | B2 * | 4/2008 | Wu | 348/581 |
| 7,551,806 | B2 * | 6/2009 | Wang et al. | 382/300 |

* cited by examiner

*Primary Examiner*—M. Lee
(74) *Attorney, Agent, or Firm*—Occhiuti Rohlicek & Tsao LLP

(57) ABSTRACT

A source image with an input vertical resolution and an input horizontal resolution is received using an input clock signal. An intermediate image with an output vertical resolution and the input horizontal resolution is generated using an intermediate clock signal by scaling the source image. An output image with the output vertical resolution and an output horizontal resolution is generated using an output clock signal by scaling the intermediate image. The frequency of the intermediate clock signal is equal to the frequency of the output clock signal multiplied by the ratio of the input horizontal resolution to the output horizontal resolution.

7 Claims, 3 Drawing Sheets

METHOD AND APPARATUS FOR IMAGE SCALING

BACKGROUND

1. Field of Invention

The present invention relates to image scaling. More particularly, the present invention relates to method and apparatus for image scaling with a specified intermediate clock.

2. Description of Related Art

FIG. 1 shows a conventional image scaler whereby a source image with a 720×240 resolution is scaled to an output image with a 640×480 resolution. The source image is input into the image scaler using an input clock signal with a frequency of 13.5 MHz (Stage I), and the vertical resolution is initially scaled up from 240 lines to 480 lines while the horizontal resolution thereof remains unchanged. An intermediate image having a resolution 720×480 is thus generated and transferred to the next stage using an intermediate clock signal with a frequency of 27 MHz (Stage II). Then, the horizontal resolution of the intermediate image is scaled down from 720 pixels to 640 pixels while the vertical resolution thereof remains unchanged, and therefore the output image is output using an output clock signal with a frequency of 25.2 MHz (Stage III).

Therefore, three clock domains are involved in the scaling of the source image, which necessitates two PLLs (phase-locked loops). Moreover, a line buffer and pixel buffer are required respectively for vertical and horizontal scaling.

Alternatively, the source image may be scaled in another manner which necessitates only one PLL. The frequency of the intermediate clock signal used to generate and transfer the intermediate image may be the same as that of the input or output clock signal so that only the PLL for generation of the output clock signal must be included in the image scaler. However, this will adversely enlarge the size of the horizontal pixel buffer.

SUMMARY

It is therefore an aspect of the present invention to provide a method for image scaling, in which the frequency of the intermediate clock signal is determined by the relationship of the input horizontal resolution and the output horizontal resolution, thus reducing the size of memory buffer.

According to one preferred embodiment of the present invention, a source image with an input vertical resolution and an input horizontal resolution is received using an input clock signal. An intermediate image with an output vertical resolution and the input horizontal resolution is generated using an intermediate clock signal by scaling the source image. An output image with the output vertical resolution and an output horizontal resolution is generated using an output clock signal by scaling the intermediate image. The frequency of the intermediate clock signal is equal to the frequency of the output clock signal multiplied by the ratio of the input horizontal resolution to the output horizontal resolution.

It is another aspect of the present invention to provide an image scaler, which uses a modified phase-locked loop instead of two conventional phase-locked loops.

According to another preferred embodiment of the present invention, the image scaler is used to scale a source image into an output image via an intermediate image. The source image has an input vertical resolution and an input horizontal resolution, and is received using an input clock signal. The intermediate image has an output vertical resolution and the input horizontal resolution, and is generated using an intermediate clock signal. The output image has the output vertical resolution and an output horizontal resolution, and is output using an output clock signal. The image scaler is characterized by comprising a phase-locked loop with two frequency dividers for outputting the intermediate clock signal and output clock signal, respectively, wherein a frequency of the intermediate clock signal is equal to a frequency of the output clock signal multiplied by a ratio of the input horizontal resolution to the output horizontal resolution.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
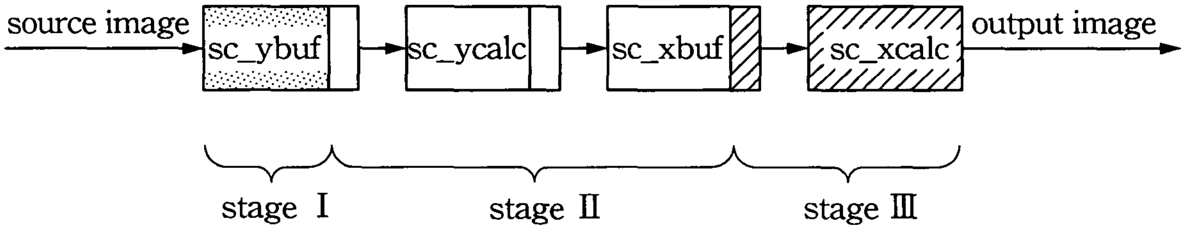
Fig. 1 (PRIOR ART)
FIG. 1 shows a conventional image scaler.

Reference will now be made in detail to the present preferred embodiments of the invention, examples of which are illustrated in the accompanying drawings. Wherever possible, the same reference numbers are used in the drawings and the description to refer to the same or like parts.

Figure 2:
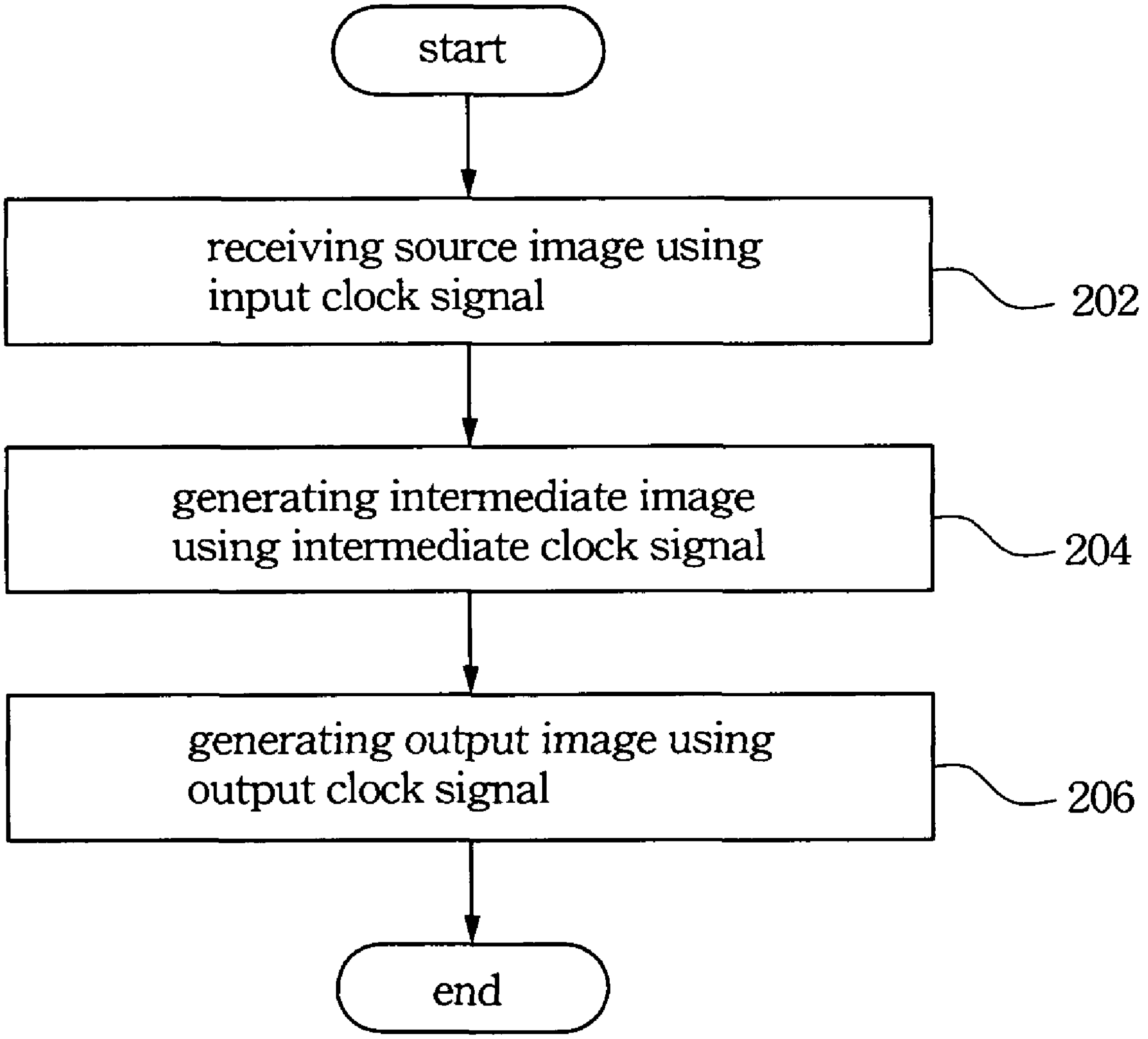
FIG. 2 is a flowchart showing a method for scaling an image according to one embodiment of the invention.

FIG. 2 is a flowchart showing a method for scaling an image according to one embodiment of the invention. A source image with an input vertical resolution and an input horizontal resolution is received using an input clock signal (step 202). An intermediate image with an output vertical resolution and the input horizontal resolution is generated using an intermediate clock signal by scaling the source image (step 204). An output image with the output vertical resolution and an output horizontal resolution is generated using an output clock signal by scaling the intermediate image (step 206).

The frequency of the intermediate clock signal is equal to the frequency of the output clock signal multiplied by the ratio of the input horizontal resolution to the output horizontal resolution, represented as:

$$\text{intermediate clock} = \text{output clock} \times \frac{\text{input horizontal resolution}}{\text{output horizontal resolution}}$$

For example, the resolution of the source image is 720×240, and the resolution of the output image is 640×480. In step 202, the source image is received using the input clock signal with a frequency of 13.5 MHz, which is determined by the resolution of the source image. In step 204, the received source image scales up the vertical resolution from 240 lines to 480 lines while the horizontal resolution thereof remains unchanged, and thus the intermediate image with a 720×480 resolution is generated using the intermediate clock signal with a frequency of 28.35 MHz. In step 206, the intermediate image scales down the horizontal resolution from 720 pixels to 640 pixels while the vertical resolution thereof remains unchanged, and therefore the output image is generated using the output clock signal with a frequency of 25.2 MHz.

In the preferred embodiment, the source image and the output image can have the same or different aspect ratios, and the scaling steps can selectively scale up or scale down the images. Moreover, the intermediate clock signal and the output clock signal can both be generated by a phase-locked loop, which is modified to have two frequency dividers for outputting clock signals with different frequencies, respectively. More particularly, a ratio of the factors of the two frequency dividers is equal to the ratio the input horizontal resolution to the output horizontal resolution as mentioned above. Therefore, the preferred embodiment can have both of the required clock signals with only one modified phase-locked loop, saving the occupied area thereof.

Figure 3:
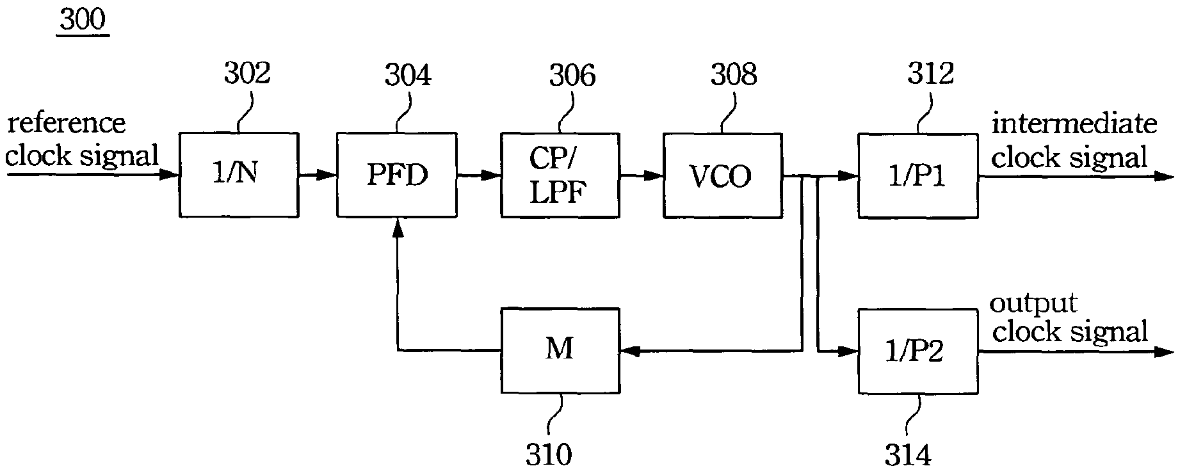
FIG. 3 shows a PLL used to scale an image by the method shown in FIG. 2.

FIG. 3 shows a PLL used to scale an image by the method shown in FIG. 2. The phase-locked loop 300 has a pre-divider (1/N) 302, a phase frequency detector (PFD) 304, a charge pump/low pass filter (CP/LPF) 306, a voltage controlled oscillator (VCO) 308, a loop divider (M) 310, a first frequency divider (1/P1) 312 and a second frequency divider (1/P2) 314. The pre-divider 302 divides a frequency of a reference clock signal by N. The phase frequency detector 304 aligns a rising edge of the divided reference clock signal to a feedback from the voltage controlled oscillator 308 and the loop divider 310.

The first frequency divider 312 outputs the intermediate clock signal for generating the intermediate image, and the second frequency divider 314 outputs the output clock signal for generating the output image. The frequency of the intermediate clock signal is equal to the frequency of the output clock signal multiplied by the ratio of an input horizontal resolution of the source image to an output horizontal resolution of the output image. More precisely, the ratio of the factors of the two frequency dividers 312 and 314 is equal to the ratio of the input horizontal resolution to the output horizontal resolution In other words, the preferred embodiment can also provide an image scaler, which uses a modified phase-locked loop instead of two conventional phase-locked loops. The image scaler is characterized by comprising the modified phase-locked loop 300, which has two frequency dividers 312 and 314 IS for outputting the intermediate clock signal and the output clock signal, respectively, and the frequency of the intermediate clock signal is equal to the frequency of the output clock signal multiplied by the ratio of the input horizontal resolution to the output horizontal resolution.

The following describes the comparison of minimal memory buffer size between the first conventional image scaler, the second conventional image scaler and the image scaler of the preferred embodiment as mentioned above. For the three image scalers, the resolution of the source image is 720×240, the resolution of the intermediate image is 720×480, and the resolution of the output image is 640×480.

The First Conventional Image Scaler:

The frequency of the input clock signal is 13.5 MHz, the frequency of the output clock signal is 25.2 MHz, and the frequency of the intermediate clock signal is 27 MHz.

Time for horizontal pixel buffer write is 720×(1/27M)=26666 ns.

Time for horizontal pixel buffer read is 640×(1/25.2M)=25396 ns.

The minimal horizontal pixel buffer size is (26666−25396)×27=47 pixels.

The Second Conventional Image Scaler:

The frequency of the input clock signal is 13.5 MHz, the frequency of the output clock signal is 25.2 MHz, and the frequency of the intermediate clock signal is 25.2 MHz.

Time for horizontal pixel buffer write is 720×(1/25.2M)=28571 ns.

Time for horizontal pixel buffer read is 640×(1/25.2M)=25396 ns.

The minimal horizontal pixel buffer size is (28571−25396)×25.2=80 pixels.

The Image Scaler of the Preferred Embodiment:

The frequency of the input clock signal is 13.5 MHz, the frequency of the output clock signal is 25.2 MHz, and the frequency of the intermediate clock signal is 25.2×(720/640)= 28.35 MHz.

Time for horizontal pixel buffer write is 720×(1/28.35M)=25396 ns.

Time for horizontal pixel buffer read is 640×(1/25.2M)=25396 ns.

The minimal horizontal pixel buffer size is (25396−25396)×28.35=0 pixels.

Accordingly, the preferred embodiment theoretically can make the size of the horizontal pixel buffer approach zero, substantially decreasing the occupied area of a memory buffer. However, in practice, some spare bits of the memory buffer still can be reserved for accidental data waiting.

In conclusion, the preferred embodiment can provide a phase-lock loop used in an image scaler and the method thereof, which especially determines the frequency of the intermediate clock signal by the relationship of the input horizontal resolution and the output horizontal resolution, to reduce the size of the horizontal pixel buffer. By this architecture, the chip size of the image scaler can be decreased, and only one modified phase-locked loop is required to complete the image scaling.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for image scaling, comprising the steps of:

receiving a source image with an input vertical resolution and an input horizontal resolution using an input clock signal;

generating an intermediate image with an output vertical resolution and the input horizontal resolution using an intermediate clock signal by scaling the source image; and generating an output image with the output vertical resolution and an output horizontal resolution using an output clock signal by scaling the intermediate image;

wherein a frequency of the intermediate clock signal is equal to a frequency of the output clock signal multiplied by a ratio of the input horizontal resolution to the output horizontal resolution, the intermediate clock signal and the output clock signal being generated by a phase-locked loop, and wherein the phase-locked loop has two frequency dividers for outputting the intermediate clock signal and the output clock signal, respectively.

2. The method for image scaling as claimed in claim 1, wherein a ratio of factors of the two frequency dividers is equal to the ratio of the input horizontal resolution to the output horizontal resolution.

3. The method for image scaling as claimed in claim 1, wherein the source image and the output image have the same or different aspect ratios.

4. The method for image scaling as claimed in claim 1, wherein the generating steps are scaling up or scaling down the images.

5. An image scaler for scaling a source image into an output image via an intermediate image, wherein the source image has an input vertical resolution and an input horizontal resolution, and is received using an input clock signal, the intermediate image has an output vertical resolution and the input horizontal resolution, and is generated using an intermediate clock signal, and the output image has the output vertical resolution and an output horizontal resolution, and is output using an output clock signal, the image scaler characterized by comprising:

a phase-locked loop with two frequency dividers for outputting the intermediate clock signal and output clock signal, respectively, wherein a frequency of the intermediate clock signal is equal to a frequency of the output clock signal multiplied by a ratio of the input horizontal resolution to the output horizontal resolution.

6. The image scaler as claimed in claim 5, wherein a ratio of factors of the two frequency dividers is equal to the ratio of the input horizontal resolution to the output horizontal resolution.

7. The image scaler as claimed in claim 5, wherein the source image and the output image have the same or different aspect ratios.

* * * * *